(12) United States Patent
Boulbon

(10) Patent No.: US 6,349,987 B1
(45) Date of Patent: Feb. 26, 2002

(54) COMPOSITE PART FOR AN AUTOMOBILE

(75) Inventor: Jack Boulbon, Deols (FR)

(73) Assignee: Eurostyle (FR)

( * ) Notice: Subject to any disclaimer, the term of this patent is extended or adjusted under 35 U.S.C. 154(b) by 0 days.

(21) Appl. No.: 09/659,308

(22) Filed: Sep. 12, 2000

(30) Foreign Application Priority Data

Sep. 15, 1999 (FR) .......................................... 99 11504

(51) Int. Cl.$^7$ .............................................. B62D 33/00
(52) U.S. Cl. ...................... 296/39.3; 296/901; 296/191; 428/212; 52/716.3; 52/800.1
(58) Field of Search ............................... 296/39.3, 901, 296/191, 39.1; 428/212, 217, 35.7, 36.8; 52/716.3, 716.8, 800.1, 800.11, 800.12, 309.1

(56) References Cited

U.S. PATENT DOCUMENTS

| | | | | |
|---|---|---|---|---|
| 3,440,129 A | * | 4/1969 | Aneselm | 296/901 |
| 4,214,788 A | * | 7/1980 | Srock | 296/39.1 |
| 4,411,944 A | * | 10/1983 | Moore | 296/39.1 |
| 4,456,644 A | * | 6/1984 | Janz et al. | 296/901 |
| 5,061,108 A | * | 10/1991 | Bien et al. | 296/191 |
| 5,102,188 A | * | 4/1992 | Xamane | 296/901 |
| 5,111,619 A | * | 5/1992 | Billin et al. | 296/39.1 |
| 5,150,944 A | * | 9/1992 | Yoshida et al. | 296/901 |
| 5,224,299 A | * | 7/1993 | Abe | 296/39.1 |
| 5,283,096 A | * | 2/1994 | Greenberg et al. | 428/217 |
| 5,419,606 A | * | 5/1995 | Hull et al. | 296/39.1 |
| 5,658,652 A | * | 8/1997 | Seller Gren | 296/191 |
| 5,814,391 A | * | 9/1998 | Hutchison et al. | 428/212 |

FOREIGN PATENT DOCUMENTS

| | | | | |
|---|---|---|---|---|
| DE | 2824008 | * | 4/1980 | 296/901 |
| DE | 3712882 | | 3/1988 | |
| DE | 4228283 | | 3/1994 | |
| DE | 19501292 | | 7/1996 | |
| EP | 856390 | | 1/1998 | |
| FR | 2769594 | | 4/1999 | |
| GB | 002041832 | * | 2/1979 | 296/901 |
| JP | 406107230 | * | 4/1994 | 296/901 |

* cited by examiner

Primary Examiner—Joseph D. Pape
Assistant Examiner—Kiran B. Patel
(74) Attorney, Agent, or Firm—Duane Morris, LLP

(57) ABSTRACT

The present invention provides a composite part that includes a semi-rigid interior part and a rigid exterior part. A sheet of flexible material (1) is given rigidifying additives and is molded before being inserted into an injection mold that adds a rigid thermoplastic strip to the edges of the said sheet. The invention is primarily suitable for producing parts for the automotive industry.

8 Claims, 3 Drawing Sheets

COMPOSITE PART FOR AN AUTOMOBILE

FIELD OF THE INVENTION

This invention relates to a composite part that is made partially of a thermoplastic material and intended specifically, but not exclusively, for automobiles.

BACKGROUND OF THE INVENTION

The automotive industry is an industry that assembles different parts to build a vehicle. The assembly costs form a significant part of the total cost of a vehicle despite the progress that has been made, in particular through robotics.

Most of the assembled parts are metallic. However, with respect to the interior trim, textile-covered plastic materials are becoming more common.

A number of parts used for the interior trim in vehicles are semi-rigid parts. They are made from relatively flexible materials such as the following textiles: moquette, baize, leather, thin films etc. It is common to stiffen these products partially by applying additives or appropriate treatments, and then molding them by thermoforming or cold forming in a press. Such parts must be adequately fastened to parts of the metallic or other structures of the vehicle body.

Currently, such parts are affixed using housings attached to the semi-rigid part. Attaching the housing requires a precise and expensive reworking process. Fasteners or clips are then mounted in the said housings and allow the part to be attached to the car body.

SUMMARY OF THE INVENTION

A first purpose of this invention is to solve this drawback and to make it possible to rigidify a semi-rigid part.

A second purpose of this invention is to obtain fastenings such as housings that are integrated with the semi-rigid part during molding and positioned appropriately.

According to the invention, the composite part comprised of a semi-rigid material has a rigid over-molding around its edges. The molded semi-rigid part is introduced into a thermoplastic injection mold so that the edges can be over-molded. This process results in a rigid plastic flange that makes it easy to handle the entire part. Another characteristic of the invention is that the rigid edge strip contains appropriately placed fastenings. These fastenings can consist of small housings to which fasteners are added, or simply of integrated clips. Thus all the attachment points are integrated into a single over-molding process with the same degree of precision that would be obtained if the entire part were made of a thermoplastic. The part can be clipped directly on to the car body, resulting in considerable time savings.

According to a specific production method of the invention, a flexible plastic area is integrated into the rigid strip. This flexible area in the rigid strip can ensure a seal where sensitive areas of the car body are involved and help to soundproof the passenger compartment.

DESCRIPTION OF THE DRAWINGS

Other characteristics and advantages of the invention will become apparent from the following description of the specific production methods, which are provided only as examples to illustrate the drawings and should not be construed as being limited thereto.

DETAILED DESCRIPTION OF THE INVENTION

Figure 1:
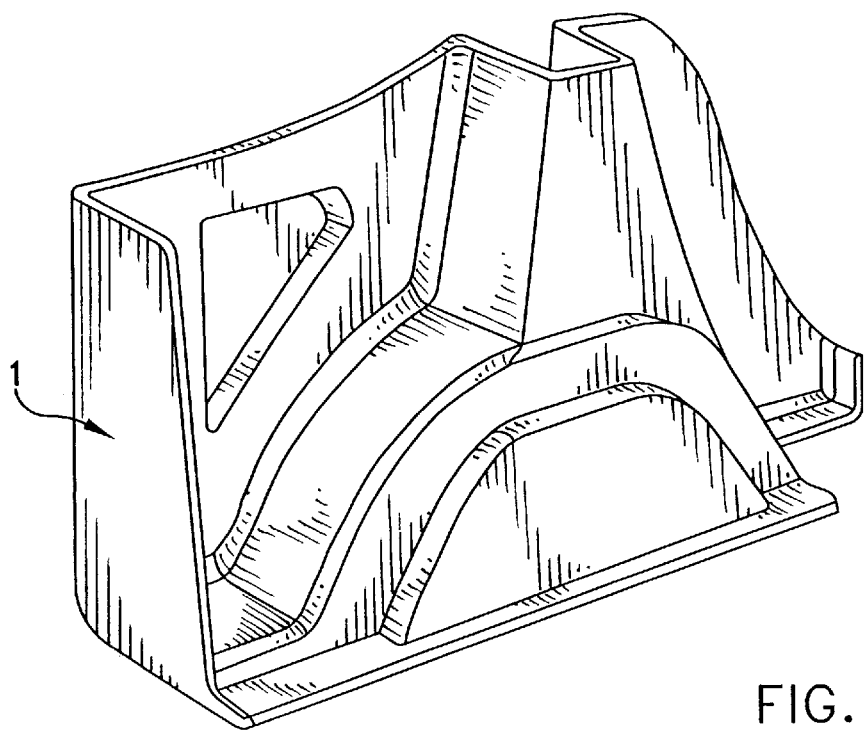
FIG. 1 is a perspective view of an example of a semi-rigid part using a prior art method.
Figure 2:
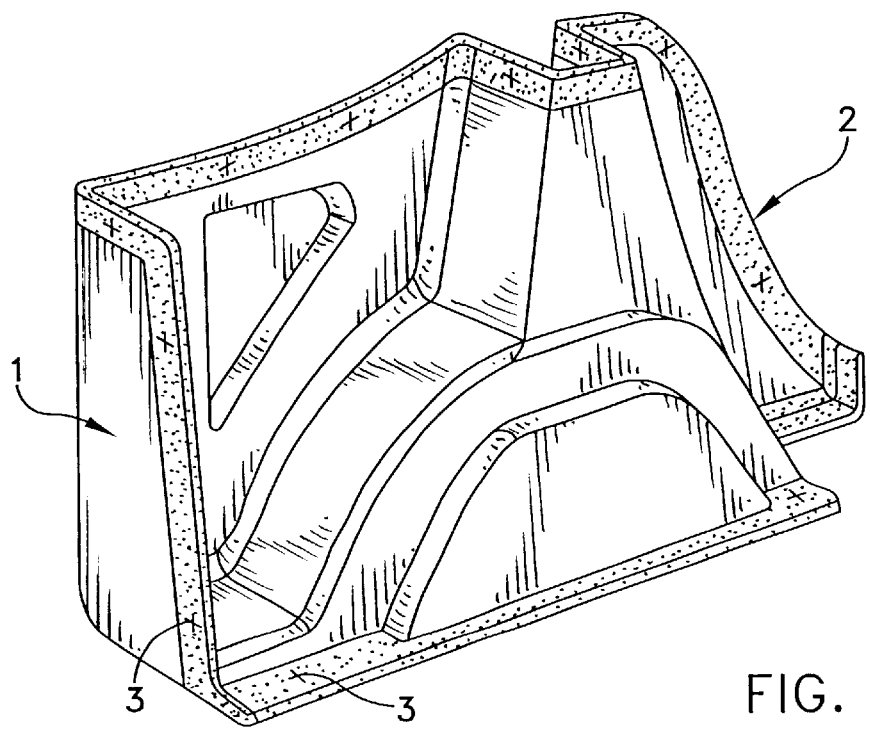
FIG. 2 is the same part as shown in FIG. 1, but equipped with a rigid strip according to the invention.
Figure 3:
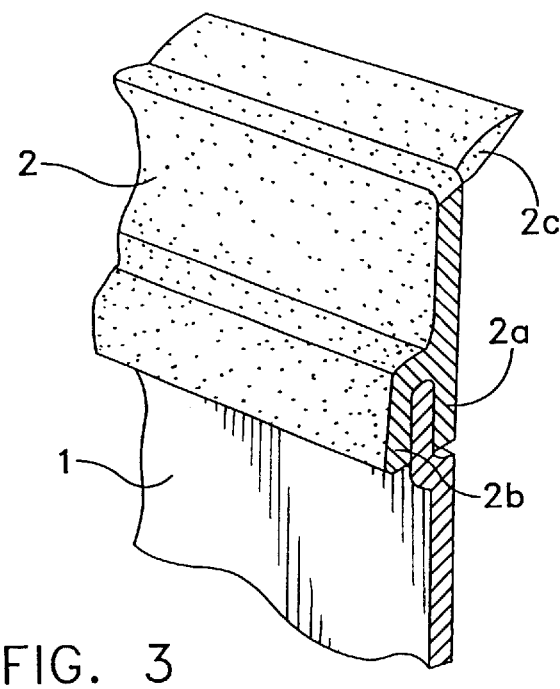
FIG. 3 is a perspective view of a bond between a semi-rigid part and a plastic part according to the invention.

FIG. 2 shows a semi-rigid part 1 for a car body with edges that have been over-molded with a rigid plastic strip 2, such as polypropylene or ABS, by injection molding. The rigid plastic strip incorporates attachment points 3. As shown in FIG. 3, the extremity of the semi-rigid part 1 is enclosed by two lips 2a, 26 in the extension of the outside surfaces of sheets 1, 2, and the edge of semi-rigid part 1 is thus caught the two lips 2a, 2b. In addition to the mechanical action, the thermoplastic material injected under pressure in a liquid state penetrates the semi-rigid material in the injection area if it is porous, thereby ensuring an indissoluble bond between the two parts.

As shown in FIG. 3, it is possible during over-molding to join the rigid plastic strip 2 to a third flexible lip 2c in order to provide a seal between the composite part and the car body.

According to a characteristic of the invention, the rigid plastic strip 2 has attachment points 3. These attachment points can consist of clips 4 that are injection molded at the same time that strip 2 is molded, as shown in FIG. 4A.

Figure 4B:
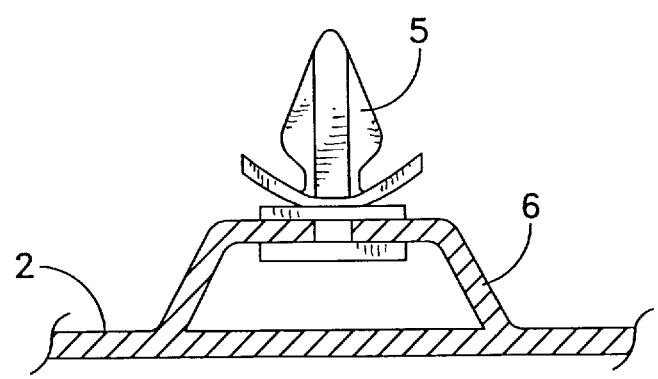
FIGS. 4A and 4B, are two different production methods for attachment points on the rigid part (4A) and on the car body (4B)
Figure 4A:
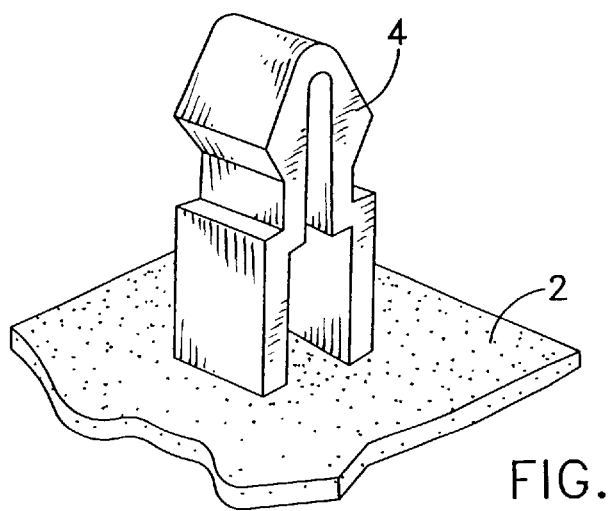

However, in some cases, and because of the difficulties that the shape of parts may create for molding, it is possible to mold only the receptacles 6 into the rigid thermoplastic strip 2 to hold fasteners or clips 5, as shown in FIG. 4B.

Figure 5:
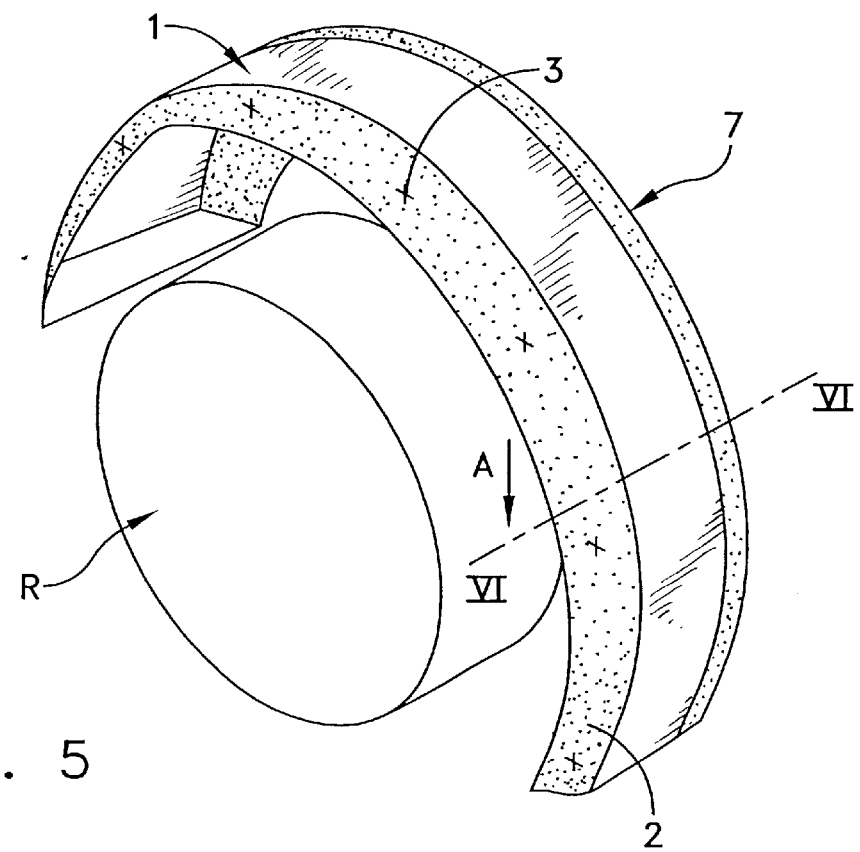
FIGS. 5 and 6 illustrate an example of an application of the invention to an element outside the passenger compartment, e.g., in the wheel well area. In all the figures, the same reference numerals designate the same elements.
Figure 6:
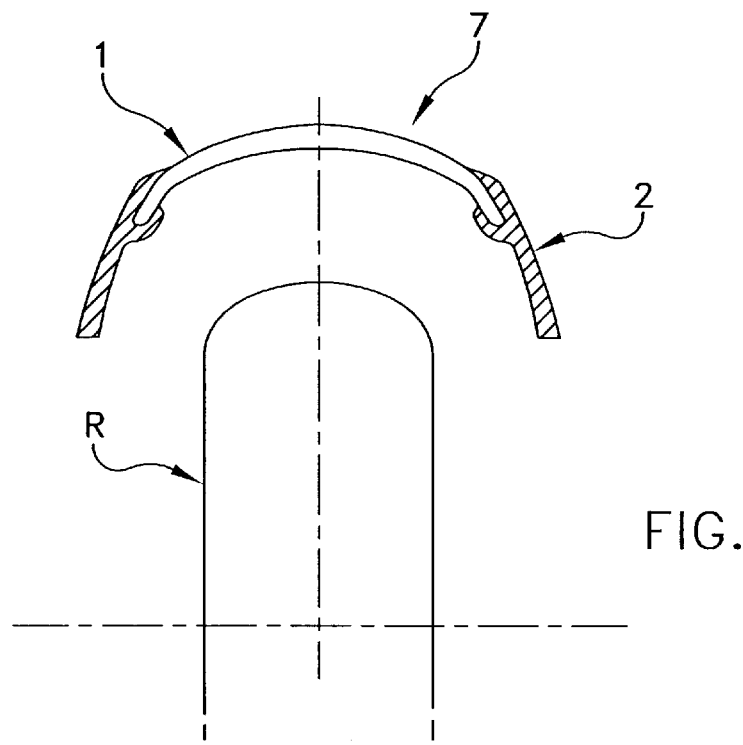

But this invention is not limited to parts for the interior of passenger compartments. These parts can also be included in exterior elements as shown in FIGS. 5 and 6. This example illustrates the application to a mud skirt on a car fender.

In FIGS. 5 and 6, wheel R is shown as a cylinder that is partially enclosed by a cylindrical sector 7. FIG. 6 is a sectional view along the line VI—VI in FIG. 5.

In this example, it is preferable for the semi-rigid material to be made of a textile material such as moquette that allows for improved soundproofing of the passenger compartment because it absorbs the noise created by the impact of stone chips during driving. As shown in FIG. 6, the rigid thermoplastic material 2 encloses the semi-rigid material 1 to surround the upper surface of the wheel. The attachment points incorporated on the rigid part provide rapid, easy assembly, and the surface of the semi-rigid material, which is generally more expensive, is reduced.

It goes without saying that many variations can be added, namely by substituting equivalent technical methods, without going outside the scope of the invention.

What is claimed is:

1. A composite part for a car body, said composite part comprising:

a sheet of material preformed to define a semi-rigid shape bounded by an edge of the sheet;

a rigid strip comprising a thermoplastic, said strip being molded onto and enclosing said sheet adjacent to the edge; and, fastening means on the strip whereby the strip is affixable to attach said composite part to said body.

2. A composite part for a car body according to claim 1 wherein the sheet has opposite sides adjacent to the edge and the rigid strip comprises two lips enclosing around the sheet at the edge, wherein the sheet has a porous structure and the thermoplastic material is molded to enter into the porous structure such that the strip penetrates into sheet.

3. A composite part for a car body according to claim 1 wherein the fastening means comprise molded clips that are integral with the strip.

4. A composite part for a car body according to claim 1 wherein the fastening means comprise housings structured for receiving clips whereby the composite part can be attached to the body.

5. A composite part for a car body according to claim 1 wherein said strip comprises a flexible plastic lip integral with said strip.

6. A composite part for a car body according to claim 1 wherein the sheet of material comprises a textile.

7. A composite part for a car body according to claim 1 wherein said sheet of material is selected from the group consisting of textile, moquette, baize, leather, and thin films.

8. A composite part for a car body comprising:

a shaped preformed sheet comprising a porous material including a textile, the sheet being bounded by an edge, and a strip having a relatively more rigid part integrally attached to the sheet and extending along the edge, the strip comprising two lips on opposite sides of the sheet adjacent to the edge, molded so as to engage in the porous material, fastening means for attaching said composite part to said body, and a plastic lip that is relatively more flexible than the rigid part, integral with said strip.

* * * * *